United States Patent [19]

Gelin

[11] 4,237,199

[45] Dec. 2, 1980

[54] CYLINDRICAL ELECTRIC CELL

[75] Inventor: Guy Gelin, Neuville de Poitou, France

[73] Assignee: Saft Leclanche, Romainville, France

[21] Appl. No.: 108,756

[22] Filed: Dec. 31, 1979

[30] Foreign Application Priority Data

Jan. 12, 1979 [FR] France ................. 79 00725

[51] Int. Cl.³ ............................................. H01M 6/10
[52] U.S. Cl. ...................................... 429/94; 429/168
[58] Field of Search ............. 429/94, 168, 165, 164, 429/66–68, 128

[56] References Cited

U.S. PATENT DOCUMENTS

| | | | |
|---|---|---|---|
| 3,796,606 | 3/1974 | Lehmann et al. ........... | 429/168 X |
| 4,032,695 | 6/1977 | Coibion ....................... | 429/94 |
| 4,032,696 | 6/1977 | Urry ............................ | 429/101 |
| 4,048,389 | 9/1977 | Bubnick et al. ............. | 429/101 |
| 4,154,905 | 5/1979 | Urry ............................ | 429/94 |
| 4,154,906 | 5/1979 | Bubnick et al. ............. | 429/94 |

*Primary Examiner*—Anthony Skapars
*Attorney, Agent, or Firm*—Kenyon & Kenyon

[57] ABSTRACT

The invention relates to a cylindrical electric cell in which the negative electrode (8) is a sheet of lithium wound round a current collector (1) which is elastically deformable and is in the form of a cylinder whose directrix is a substantially circular curve with two distinct ends. In accordance with the invention, the two portions of cylinder close to said ends are cut into matching shapes so that they fit into each other, the protruding parts (2) of one portion being accomodated in the recessed parts (3) of the other portion. Application to electric cells whose positive active material is liquid.

2 Claims, 3 Drawing Figures

CYLINDRICAL ELECTRIC CELL

The present invention relates to an improvement to a cylindrical electric cell of the type described in U.S. Pat. No. 3,796,606; the cell has a positive electrode in contact with the outside wall and separated from the negative electrode by a porous separator; the negative electrode is constituted by a metal sheet whose normal potential is highly negative. The negative electrode is wound round an elastically deformable current collector in the form of a cylinder whose directrix is a substantially circular curve with two distinct ends.

In such cells, the negative electrode is consumed as the cell discharges and if the positive electrode does not expand to compensate for the thinning of the negative electrode, the gap between the two electrodes would increase, thereby interrupting ionic contact; the current collector is therefore arranged to push the negative electrode towards the positive electrode by increasing its own diameter by means of a spring effect.

The abovementioned patent describes lithium electric cells in which the cathode (positive) active material is a solid such as copper oxide, silver chromate or copper sulphide. In such cases, the discharged lithium in the oxide state gets into the pores of the positive electrode. This increases the volume of the positive electrode and partially compensates for the reduction in volume of the negative electrode.

This is not the case when the volume of the positive electrode is invariable. This occurs in cells with a liquid positive active material. The positive electrode is a simple collector whose pores collect the products of the negative discharge without changing volume. Therefore, the negative cylindrical collector must be able to increase its diameter more than in the case of the forms of collectors described in the cited patent. Now, in the said patent, the form of the directrix is an incomplete circle or a portion of a spiral.

In the case of an incomplete circle, the missing portion must not be too long, since in that case it would not adequately perform the function of a collector or as a support for the negative electrode.

In the case of a portion of a spiral, the stretched spring must have a double thickness around a major part of the arc of a circle. This causes deformation and therefore uneven current distribution.

The present invention aims to remedy these disadvantages.

It provides a cylindrical electric cell whose positive electrode is in contact with the cylindrical outer wall of the cell and separated from the negative electrode by a porous separator and whose negative electrode is constituted by a sheet of metal wound round an elastically deformable current collector in the form of a cylinder whose directrix is a substantially circular curve with two distinct ends, wherein at least those two portions of said current collector cylinder which are close to said ends are cut into matching shapes so that they fit into each other, the protruding parts of one portion being accomodated in recessed parts of the other portion, and wherein said metal sheet is divided into at least two parts separated by at least one cut occupying a plane passing through the axis of the cell.

In this way, the spring keeps the outside form of a regular cylinder, however much it is stretched, and it exerts a regularly distributed centrifugal force on the metal sheet. Due to the fact that it is divided into at least two parts, the metal sheet wound round the collector is constantly applied against the porous separator. The preferred forms of the protruding portions are also the simplest, namely, strips which are rectangular when developed in a plane and which, in use, constitute interdigitated ribs delimited by segments of a generatrix of a cylinder and by arcs of circles in planes perpendicular to the axis of the cell.

The invention will be better understood from the following description of an embodiment illustrated in the following drawings, in which.

Figure 1:
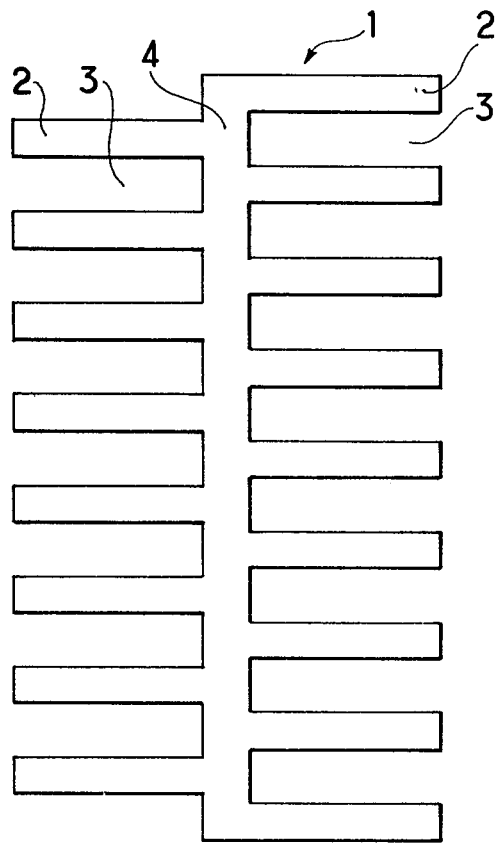
FIG. 1 illustrates the developed form of a collector suitable for use in a cell in accordance with the invention.

In FIG. 1, the reference numeral 1 designates a collector in accordance with the invention. The collector 1 is shown developed in a plane as when it is cut out before being formed. In the example described, it is cut out from a sheet of stainless steel, but, of course, any metal can be used providing it has firstly the required elasticity and secondly sufficient resistance to attack by the components of the cell. Therefore, rectangular spaces 3 have been cut out on either side of a spine portion 4, so as to leave rib-like strips 2. Each space 3 on one side of the portion 4 is adjacent to a strip 2 on the other side of the portion 4. In this way, when the collector 1 is curved into a cylindrical shape, the ends of the strips 2 on one side fit into the spaces 3 on the other side. The width of the portion 4 is not a particularly critical feature, but it is important for the spaces 3 to be sufficiently long to accomodate the strips 2 when the collector is curved to its minimum diameter.

Figure 2:
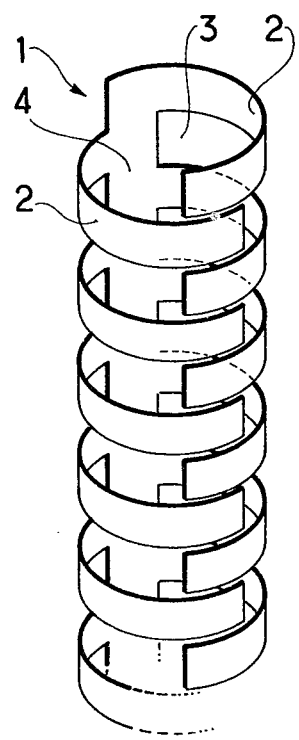
FIG. 2 illustrates the principle of a collector in accordance with the invention in the form ready for use.

FIG. 2 shows a portion of the collector in cylindrical form, the ends of the strips 2 entering the spaces 3.

Figure 3:
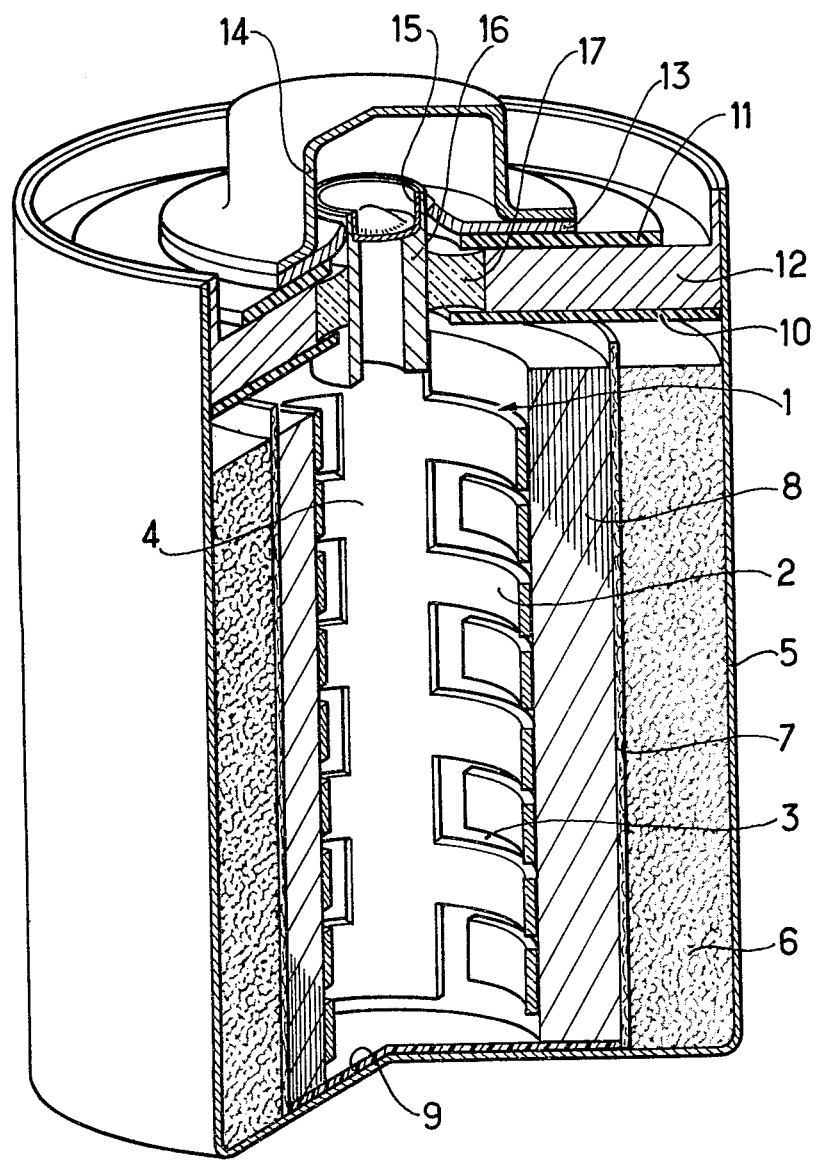
FIG. 3 illustrates an electric cell in accordance with the invention.

FIG. 3 illustrates a partial cross-section of a cell, e.g. a lithium cell whose positive active material is constituted by a solution of tetrachloroaluminate in thionyl chloride. The stainless steel casing 5 of the cell has the form of a can. The positive electrode 6 in contact with the casing 5 is constituted by a porous carbon ring. The active material 8 of the negative electrode is separated from the electrode 6 by a porous separator 7. It is constituted by a sheet of lithium bent to form a cylinder and divided into two half-cylinders by a cut in a plane passing through the axis of the cell. Inside the cylinder thus formed, a collector 1 in accordance with the invention is in close contact with the two lithium half-cylinders. The spring formed by the collector is tightened so that the strips 2 occupy the spaces 3 substantially as much as possible. In this way, it presses against the lithium sheet 8 and pushes it towards the separator 7 and the positive electrode 6. An insulating disc 9 separates the sheet 8 and the collector 1 from the bottom of the casing 5.

The upper portion of the casing 5 is closed by a set of parts which do not form a part of the invention. A cylindrical part 16 made of ferronickel alloy is electrically connected to the collector 1, while another ferronickel part 12 in the form of a disc hollowed out at the centre and having an outer edge which is thicker than the rest of it is welded by the outer edge to the casing 5. It is mechanically connected to the part 16 by a glass solder 17 which electrically insulates it. A polytetrafluorothylene disc 10 protects the part 12 from the electrochemical components of the cell.

The part 16 is stopped on the inside by a stainless steel stopper 15 which is welded to it in a fluid-tight manner. A stainless steel disc 13 whose centre is hollowed out is force-fitted on the part 16 and welded thereto. It is separated from the part 12 by a polytetrafluoroethylene disc 11. A metal cap 14 is laid on the disc 13 and is welded thereto. The cap 14 acts as a negative terminal of the cell, whose casing 5 acts as a positive output.

When the cell discharges, the portion of the lithium sheet 8 which is close to the separator 7 is progressively dissolved in the electrolyte, which it absorbs, and fills the pores of the electrode 6. Under the effect of the collector, which tends to increase in diameter on expanding, the sheet 8 continues to be applied against the separator 7. Therefore, discharge occurs regularly and without interruption.

Of course, the invention is not limited to the embodiment which has just been described.

I claim:

1. A cylindrical electric cell whose positive electrode is in contact with the cylindrical outer wall of the cell and separated from the negative electrode by a porous separator and whose negative electrode is constituted by a sheet of metal wound round an elastically deformable current collector in the form of a cylinder whose directrix is a substantially circular curve with two distinct ends, wherein at least one of those two portions of said current collector cylinder which are close to said ends are cut into matching shapes so that they fit into each other, the protruding parts of one portion being accomodated in the recessed parts of the other portion, and wherein said metal sheet is divided into at least two parts separated by at least one cut occupying a plane passing through the axis of the cell.

2. A cell according to claim 1, wherein said recessed parts are delimited by arcs of circles whose planes are perpendicular to the axis of the cell and by segments of a generatrix of a cylinder.

* * * * *